United States Patent
Reinards et al.

(10) Patent No.: US 6,729,459 B2
(45) Date of Patent: May 4, 2004

(54) CLUTCH CONTROL SYSTEM AND METHOD

(75) Inventors: Marco Reinards, Bleialf (DE); Nicolai Tarasinski, Frankenthal (DE); Helmut Schafer, Ketsch (DE)

(73) Assignee: Deer & Company, Moline, IL (US)

( * ) Notice: Subject to any disclaimer, the term of this patent is extended or adjusted under 35 U.S.C. 154(b) by 0 days.

(21) Appl. No.: 10/233,139

(22) Filed: Aug. 29, 2002

(65) Prior Publication Data

US 2003/0051969 A1 Mar. 20, 2003

(30) Foreign Application Priority Data

Sep. 15, 2001 (DE) .......................................... 101 45 588

(51) Int. Cl.⁷ ............................................. B16K 17/28
(52) U.S. Cl. ............... 192/103 F; 192/3.58; 192/109 F; 477/176
(58) Field of Search ........................... 192/3.58, 109 F, 192/85 R, 103 F; 180/53.1; 74/11, 15.6, 15.63; 477/171, 172, 175, 176, 177

(56) References Cited

U.S. PATENT DOCUMENTS 5,299,129 A * 3/1994 Uchida et al. ................ 701/51
5,494,142 A * 2/1996 Kale ......................... 192/12 C
5,549,185 A 8/1996 Kale ......................... 192/12 C
6,080,081 A * 6/2000 Sauermann et al. ........... 477/79
6,193,630 B1 2/2001 Janasek et al. .............. 477/156
6,267,189 B1 * 7/2001 Nielsen et al. ............. 180/53.1
6,564,915 B2 * 5/2003 Lorentz et al. ............ 192/3.58

FOREIGN PATENT DOCUMENTS

| DE | 40 01 398 A1 | 7/1991 |
| DE | 41 01 610 C1 | 8/1992 |
| DE | 41 24 722 C2 | 1/1993 |
| DE | 42 15 583 A1 | 11/1993 |
| DE | 197 40 346 A1 | 3/1999 |
| WO | 00/52549 | 9/2000 |

* cited by examiner

Primary Examiner—Saul Rodriguez

(57) ABSTRACT

A PTO clutch of an agricultural vehicle connects an input driveline to an output driveline for coupling to an attached implement. A method and system for controlling the PTO clutch includes sensors for sensing rotational speeds on both sides of the clutch. Clutch slip is determined from the sensed speeds. A controller receives an actual slip signal and a desired slip signal and controls pressure in the clutch to maintain a constant desired clutch slip in order to avoid overload conditions. The torque transmitted by the clutch is determined as a function of the slip in the clutch and the clutch pressure, and a signal representing this torque is displayed to an operator.

15 Claims, 2 Drawing Sheets

CLUTCH CONTROL SYSTEM AND METHOD

BACKGROUND OF THE INVENTION

The present invention relates to a system and method for controlling a clutch, particularly a power take-off (PTO) shaft clutch.

Various systems and methods are known for controlling a torque transmitting clutch, such as a PTO clutch for transmitting power to an attached implement. There are, for example, control systems which use sensed rotational speed to determine operating conditions of a PTO shaft clutch. Published patent DE-A-40 01 398 describes a power take-off shaft clutch which is controlled by an electronic evaluation unit and thereby can react to critical operating conditions. In particular, slip of the power take-off shaft clutch is to be avoided in order to prevent increased wear or destruction of the clutch. Sensors sense engine specific data, such as rotational speed and torque, so that the evaluation unit can react to certain limit values. If a certain engine limit rotational speed value is not reached, the power take-off shaft clutch is disengaged and the load on the driveline is removed.

The system of DE-A-40 01 398 also senses the rotational speed values at the inlet and the outlet of the power take-off shaft clutch, and monitors the clutch slip by comparison of these values. When pre-determined values of slip are exceeded, the electronic evaluation unit disengages the power take-off shaft clutch by means of a control valve. However, disengaging the clutch when the slip limit values are exceeded leads to an interruption of the operating process that can only be resumed after a renewed clutch engagement process. A similar condition occurs when an engine rotational speed limit is not reached and the PTO shaft clutch is disengaged, in order to reduce the load on the engine driveline. In this case, the clutch can be re-engaged only under restricted operating conditions.

It would be desirable to provide a method and a system for controlling a PTO clutch and which overcomes the aforementioned problems. In particular, it would be desirable to monitor the load on the clutch during the operation of attached implements, so that overload conditions on the driveline as well as on the attached implement and the components connected to it can be avoided.

SUMMARY

Accordingly, an object of this invention is to provide a PTO clutch control system which maintains a constant slip in the clutch.

This and other objects are achieved by the present invention, wherein a pressure operated PTO clutch of an agricultural vehicle connects an input driveline to an output driveline for coupling to an attached implement. A method and system for controlling the PTO clutch includes sensors for sensing rotational speeds on both sides of the clutch. Clutch slip is determined from the sensed speeds. A controller receives an actual slip signal and a desired slip signal and controls pressure in the clutch to maintain a constant desired clutch slip in order to avoid overload conditions on the input driveline or the output driveline of agricultural machines and their attached implements. A signal representing the torque transmitted by the clutch is displayed to an operator. The torque transmitted by the clutch is determined as a function of the slip in the clutch and the clutch pressure.

A controller maintains the slip at a constant value independent of the torque transmitted, by actively controlling the clutch pressure. Since the torque transmitted by the clutch has an approximately linear relationship with the clutch pressure and the valve current, these parameters can be utilized to determine the torque transmitted by the clutch. The higher the valve current, and therewith the pressure level at which the clutch can be operated at the desired slip, the higher is the torque transmitted by the clutch. The load or torque transmitted by the clutch is determined as a function of the constant slip value and the clutch pressure.

Detecting load by electronically controlling slip has been shown to be useful in PTO shaft drives. The control can react to changes in the load so rapidly that a stable operation with relatively constant slip is possible. During testing on a PTO clutch brake with a defined load it could be shown that the clutch pressure and therewith the valve control electrical current are representative of the torque in the PTO shaft and that it is possible to determine load during operation. A further advantage of the slip control is the protective function against overload. Shock loads and related torque peaks in the PTO shaft driveline during operation are intercepted and damped by short term peaks in the slip of the PTO shaft clutch.

The clutch slip is preferably maintained at a predetermined standard slip value, such as between 0.1% to 2.0%. The most appropriate value has been found to be a standard slip value of approximately 0.5%.

Slip is maintained constant by varying the clutch pressure with a valve, preferably a proportional pressure control valve. Valve electrical current is utilized as control magnitude for the control of the slip. Preferably, the control magnitude is limited by an input of a maximum control magnitude so that a maximum torque cannot be exceeded in the PTO shaft, thus protecting the vehicle driveline, the PTO shaft gearbox and the drive for the attached implement.

The maximum control magnitude can be inputted manually or automatically by an identification system on the attached implement which can be plugged into a CAN, ISO, LBS or a similar interface in a "Plug-and-Play" manner.

The PTO shaft clutch control system includes sensors and an evaluation system. The sensors detect a rotational speed on each side of the clutch. The evaluation system, which is part of an electronic control system, determines the slip in the clutch considering the gear ratio of the clutch system. The control system continuously senses clutch pressure. Clutch pressure is controlled to maintain clutch slip at a constant value. The torque transmitted by the clutch is determined from the constant value of the slip and the clutch pressure. Preferably, the electronic control is an integrated controller and is configured corresponding to DIN 19226.

The invention determines the torque transmitted by the clutch using simple sensors, and displays this information continuously to the operator. With this invention the torque transmitted by the clutch can be limited to protect the driveline and the attached implement against overloads. In addition, sudden changes in the torque are prevented by short-term increases in the clutch slip. The invention is extremely economical because no significant increase in sensor capability is required.

This control system may be applied to agricultural machines which have a PTO shaft connected to an attached implement. The PTO shaft clutch is preferably a wet multi-disk clutch such as used on John Deere series 6010 to 6910 agricultural tractors. Such clutches have a very high durability, even when subjected to slipping operation.

DETAILED DESCRIPTION

Figure 1:
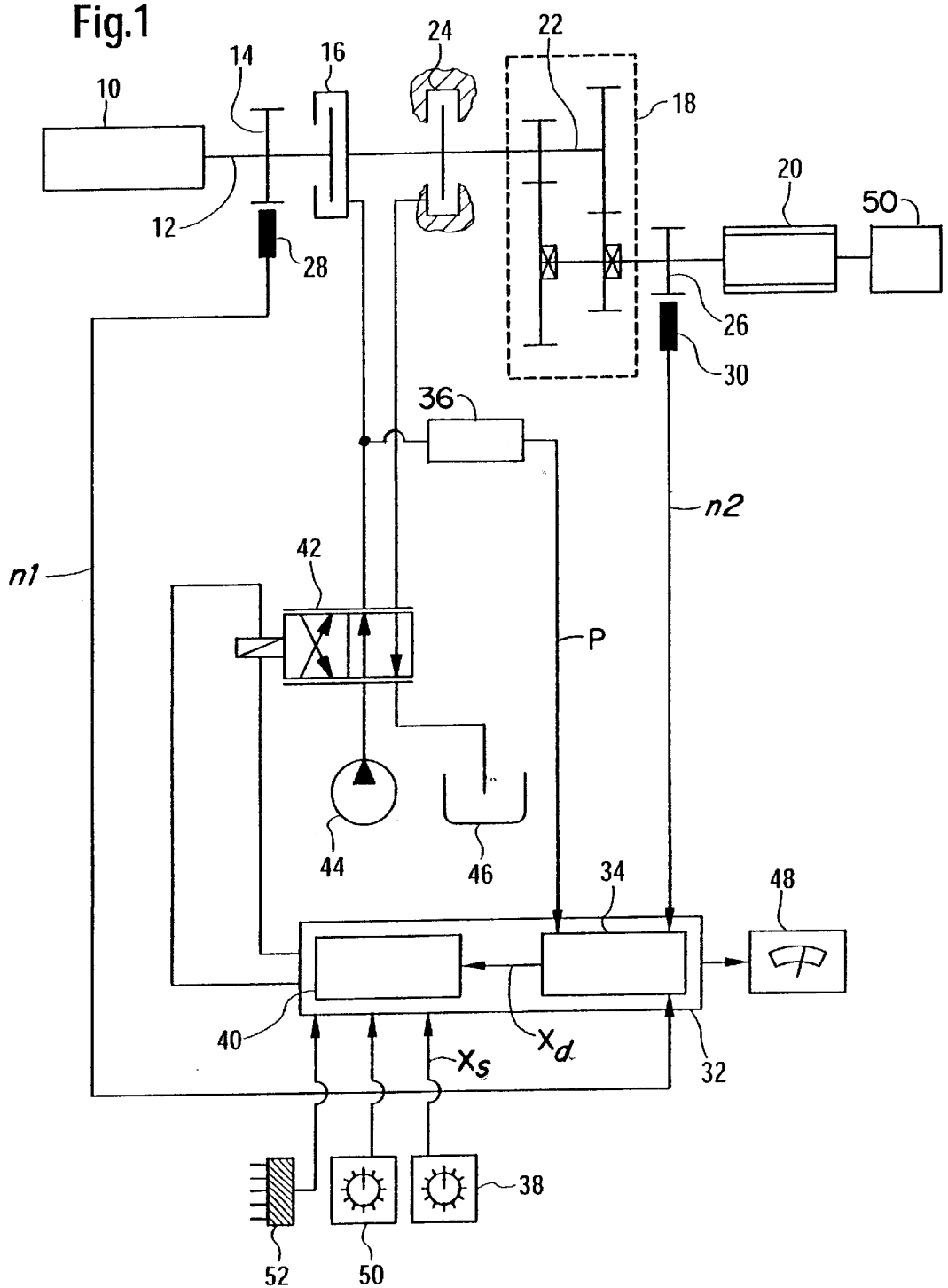
FIG. 1 is a schematic diagram of a control system for controlling the slip of a PTO shaft clutch.

Referring to FIG. 1, an internal combustion engine 10 drives a drive shaft 12. A rotation speed sensing gear 14 is coupled to drive shaft 12. A hydraulic PTO shaft clutch 16 connects the drive shaft 12 with a two-stage PTO shaft gearbox 18 that transmits torque to a PTO shaft 20. An implement 54 can be connected to the PTO shaft 20 or the PTO stub shaft. As is well known, the engine 10 drives the vehicle drive wheels (not shown) through a vehicle gearbox (not shown).

The input stage 22 of the PTO shaft drive gearbox 18 is connected to a hydraulic brake 24 which can brake and stop the entire PTO shaft output driveline. A gear 26 is mounted on the PTO shaft 20 for sensing the output shaft rotational speed. Rotational speed sensors 28 and 30 sense the rotational speeds of the drive shaft 12 and the PTO shaft 20 and supply speed signal n1 and n2 to an evaluation unit 34 which is integrated into a control unit 32. The evaluation unit 34 determines the slip X of the clutch 16 from speeds n1 and n2 and receives a gear ratio signal of the PTO shaft gearbox 18, from an appropriate sensor (not shown).

The clutch 16 and the brake 24 are controlled by a electrohydraulic proportional valve 42, which in a first position, as shown, connects the clutch 16 with a hydraulic pump 44 and connects the brake 24 with an unpressurized reservoir 46. In a second position the proportional valve 42 connects the brake 24 with the hydraulic pump 44 and connects the clutch 16 with the reservoir 46. Proportional valve 42 controls the pressure in clutch 16 and maintains the pressure in clutch 16 proportional to the magnitude of the electrical current applied to the solenoid of valve 42.

A pressure sensor 36 transmits a clutch pressure signal P to the evaluation unit 34. Unit 34 determines the torque transmitted by the clutch 16 as a function of the clutch slip and the clutch pressure, and supplies a torque signal to display 48. A target slip value input unit 38 provides a target slip value Xs to the control unit 32 so that the controlled value of the slip can be adjusted. Evaluation unit 34 receives the target slip value Xs, compares it to the actual slip X, and provides a differential slip value Xd as an input to controller 40. Controller 40 operates as shown FIGS. 2 and 3 and provides a solenoid control electrical current to the solenoid of proportional valve 42 to maintain the slip in clutch 16 at the desired target slip.

A manual input unit 50, such as a rotary potentiometer placed in the vehicle cab (not shown), can be used to set a limit value for the valve current and thereby the pressure in the clutch or the maximum torque that can be transmitted by the clutch 16. The control unit 32 uses this limit value to avoid overload conditions on the input driveline as well as the output driveline.

An implement connected to the PTO shaft 20 can be identified to the control unit 32 by an interface 52, such as a CAN, ISO, LBS or similar interface, to which can be coupled a connector (not shown) in a "Plug and Play" manner. For each type of attached implement a maximum torque value can be stored in the control unit 32, so that torque can be limited to a maximum value specific to the particular attached implement.

Figure 2:
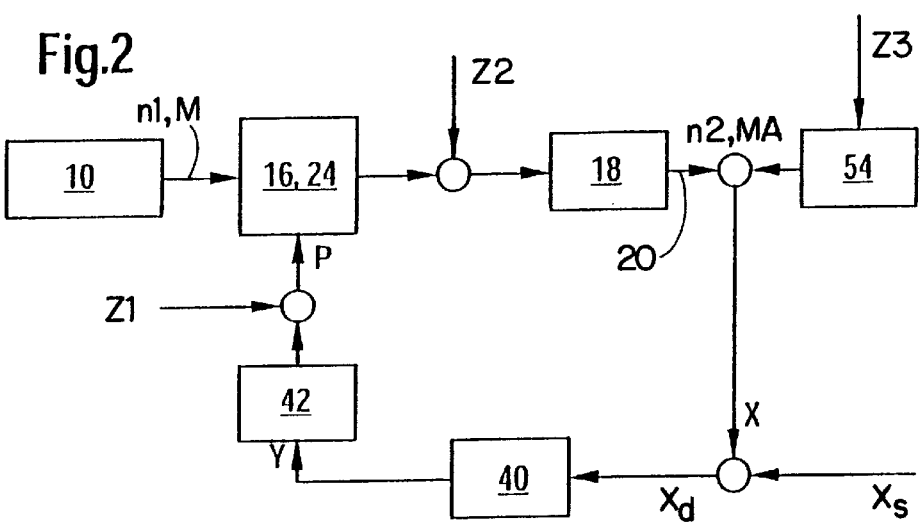
FIG. 2 is a control system diagram of the present invention.

Referring now to FIG. 2, the engine 10 rotates at a rotational speed of n1 and delivers torque M1, which is transmitted by the clutch 16 and gearbox 18 to a PTO shaft 20. The PTO shaft 20 rotates at a rotational speed of n2 and transmits the output torque MA to the attached implement 54. An actual slip value X is a function of rotational speeds n1 and n2, of the transmission ratio of the PTO shaft gearbox 18, of the disturbance magnitude Z2, which depends on the friction coefficient or wear condition of the clutch, and of disturbance magnitude Z3, which depends on the load of the attached implement 54. The actual slip value X is compared with a predetermined slip target value Xs of, for example, 0.5%.

The resulting slip differential value Xd is an input to the controller 40. Preferably, the response of controller 40 varies depending upon the range of the input value Xd. In response to the slip differential value Xd, the controller 40 supplies to valve 42 a valve current control signal Y. In response to signal Y, valve 42 controls the pressure in clutch 16 and or in the brake 24. Clutch pressure P is also a function of pressure variations represented by disturbance magnitude Z1. Controller 40 is designed to maintain slip difference Xd as small as possible and preferably equal to zero, and to thereby maintain the slip of clutch 16 at the desired constant slip target value Xs.

Since at a constant controlled slip, a known relationship exists between the drive torque MA operating at the PTO shaft 20 and the current in the valve 42, which can be determined by tests or by theoretical calculations, the output torque MA can be determined from the existing slip value and the current in the valve 42.

Preferably, the controller is optimized with respect to its response to disturbances, and to prevent increased slip. If, however, a sudden increase in the torque occurs during operation at the PTO stub shaft and as a result the slip exceeds the predetermined value, for example, of 0.5%, then the controller reacts accordingly and increases the current to the valve 42 and increases the clutch pressure. During very rapid changes in the power requirement of the attached implement very high undesirable slip can occur for brief periods, so that the control must react sufficiently fast, in order to maintain the slip as constant as possible.

In order to assure an optimum and rapid control response, the response of controller 40 varies depending upon the magnitude of the actual slip X. For example, controller 40 may have three different sets of control parameters, each for one of three corresponding ranges of actual slip X. Such control parameters may include a proportional amplification parameter, Kp(1-3) and a response time parameter Tn(1-3), such as defined by DIN 19266, so that the controller will have a proportional and integral performance and will perform dynamically. Preferably, the response of the controller will be faster and more aggressive for higher actual slip values, so that the proportion of time at increased slip values is reduced. Preferably, an operator may manually adjust the controller 40 to optimize its performance in response to sudden disturbances.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the claims.

We claim:

1. A method of controlling a hydraulically operated PTO shaft clutch, the method comprising:

sensing clutch input speed;

sensing clutch output speed;

sensing a hydraulic pressure in the clutch;

determining clutch slip from the sensed input and output speeds;

controlling clutch pressure to maintain clutch slip at a constant value; and determining torque transmitted by the clutch as a function of the clutch slip and the clutch pressure.

2. The clutch control method of claim 1, wherein:

the clutch slip is maintained at a predetermined standard slip value between 0.1% and 2.0%.

3. The clutch control method of claim 2, wherein:

the predetermined standard slip value is approximately 0.5%.

4. The clutch control method of claim 1, further comprising:

controlling clutch slip by varying clutch pressure with a proportional valve.

5. The clutch control method of claim 4, wherein:

utilizing valve current as a control signal for controlling the slip.

6. The clutch control method of claim 5, further comprising:

limiting the control signal to a maximum value.

7. The clutch control method of claim 6, further comprising:

manually inputting said maximum value.

8. The clutch control method of claim 6, further comprising:

inputting said maximum value in a "Plug and Play" manner with an interface unit.

9. A clutch control system for controlling a hydraulically actuated PTO shaft clutch, the control system comprising:

a first sensor for sensing an input speed of the clutch;

a second sensor for sensing an output speed of the clutch;

a clutch pressure sensor;

an evaluation unit which determines slip of the clutch as a function of the sensed speeds; and a control unit which, as a function of sensed input and output speed and sensed clutch pressure, controls the clutch pressure to achieve a constant clutch slippage, the control unit also determining torque transmitted by the clutch as a function of the clutch slip and the clutch pressure.

10. The clutch control system of claim 9, further comprising:

the control unit has a response which varies as a function of clutch slip.

11. The clutch control system of claim 9, further comprising:

an input device for inputting a desired slip target value.

12. The clutch control system of claim 9, further comprising:

a proportional valve for adjusting pressure in the clutch.

13. The clutch control system of claim 9, further comprising:

an adjusting means for inputting a value corresponding to a maximum torque to be transmitted through the clutch.

14. The clutch control system of claim 9, further comprising:

an interface unit for inputting said maximum torque value in a "Plug and Play" manner.

15. The clutch control system of claim 9, further comprising:

a torque indicator for indicating torque transmitted by the clutch.

* * * * *